United States Patent [19]

Bates

[11] Patent Number: 4,864,081
[45] Date of Patent: Sep. 5, 1989

[54] INSULATIVE COVERING FOR UNDERCARPET POWER CABLE SPLICE

[75] Inventor: Reginald A. Bates, Kernersville, N.C.

[73] Assignee: AMP Incorporated, Harrisburg, Pa.

[21] Appl. No.: 189,901

[22] Filed: May 3, 1988

[51] Int. Cl.$^4$ ............................................. H01R 9/07
[52] U.S. Cl. ............................... 174/88 R; 174/71 R; 174/117 FF; 174/117 A
[58] Field of Search ................. 174/70 C, 71 R, 72 R, 174/72 C, 117 A, 84 R, 84 C, 88 R

[56] References Cited

U.S. PATENT DOCUMENTS

| | | | |
|---|---|---|---|
| 1,751,386 | 3/1930 | Belden | 174/700 |
| 3,270,122 | 8/1966 | Binek | 174/117 A |
| 4,255,612 | 3/1981 | Grundfest | 174/88 R |
| 4,319,075 | 3/1982 | Willette | 174/117 FF |
| 4,417,096 | 11/1983 | Willette | 174/71 R |
| 4,551,579 | 11/1985 | Takasaki | 439/422 X |
| 4,560,224 | 12/1985 | Weisenburger | 439/422 |

OTHER PUBLICATIONS

Hubbell Patch Kit for System, PDC Undercarpet Wiring (no date).
Burndy Flexway Undercarpet Systems (no date).
T & B Versa-Trak® Cable, Tape and Tap & Splice Installing Tools for Under-Carpet Flat Conductor Cable (no date).

Primary Examiner—Morris H. Nimmo
Attorney, Agent, or Firm—Eric J. Groen

[57] ABSTRACT

An electrical power distribution system is disclosed which includes flat undercarpet power cable. The cable includes portions of the cables spliced to one another to effect a continuation of the power distribution. A covering for the spliced joint of the two cables includes two foam layers having double backed adhesive thereon which, when placing the two facing surfaces together, adhesively affixes the two foam layers together. The outer surfaces, which include adhesive, adhere a protective sheet of insulative material thereto.

10 Claims, 6 Drawing Sheets

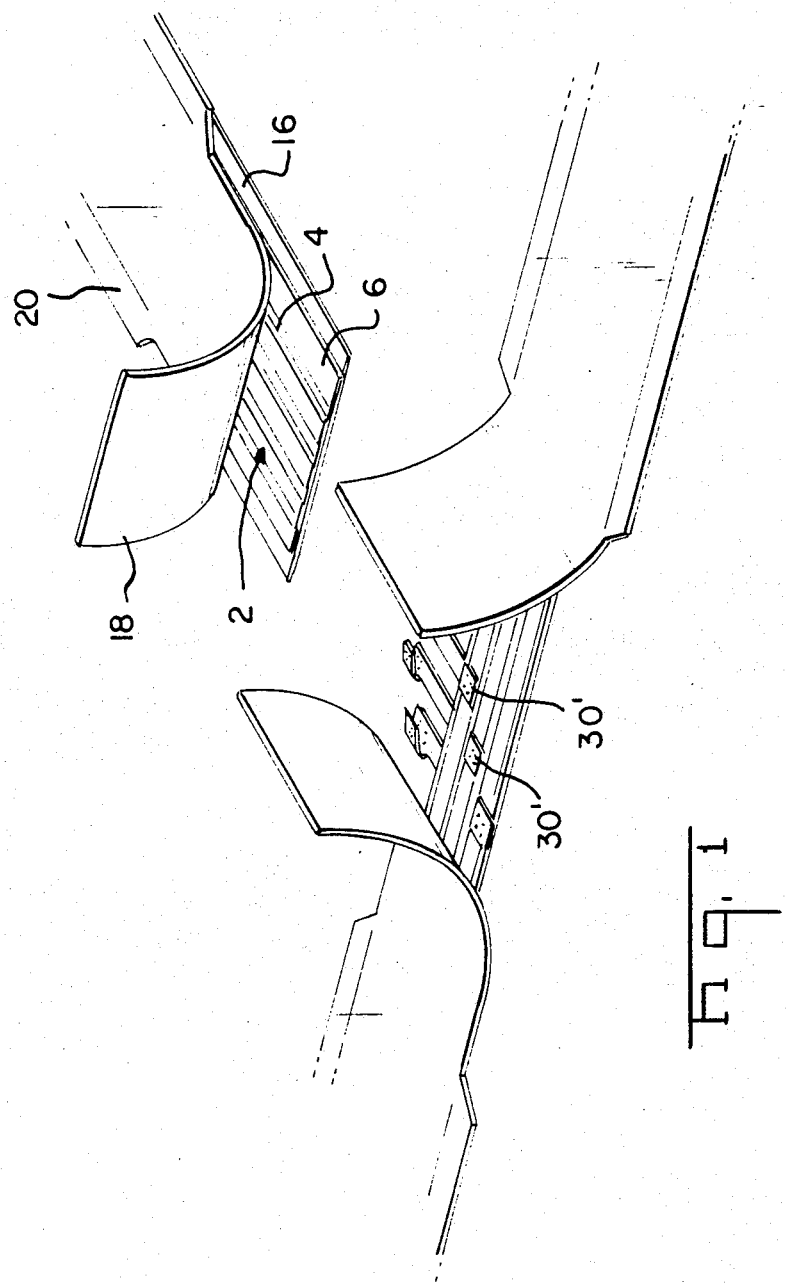

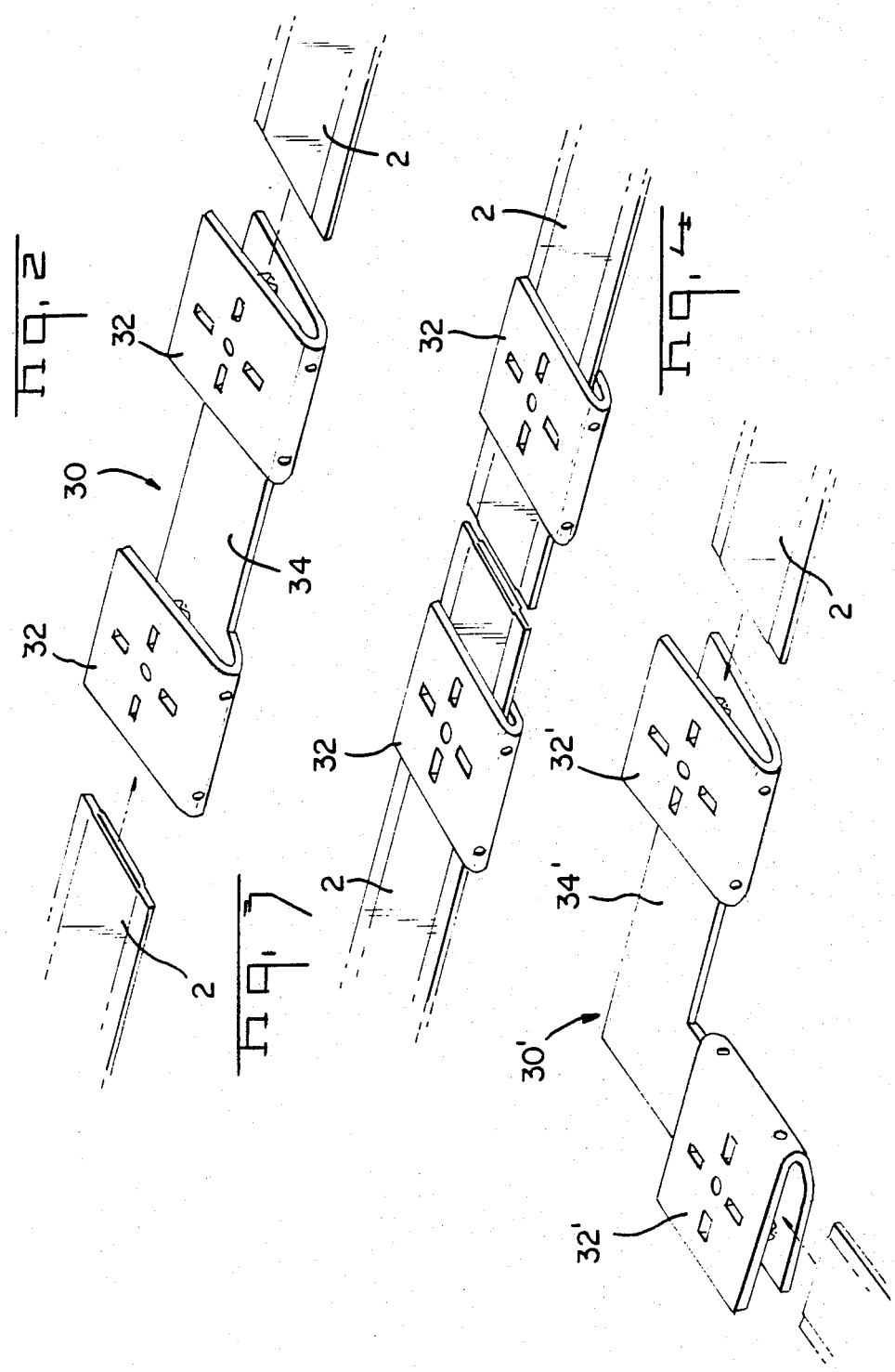

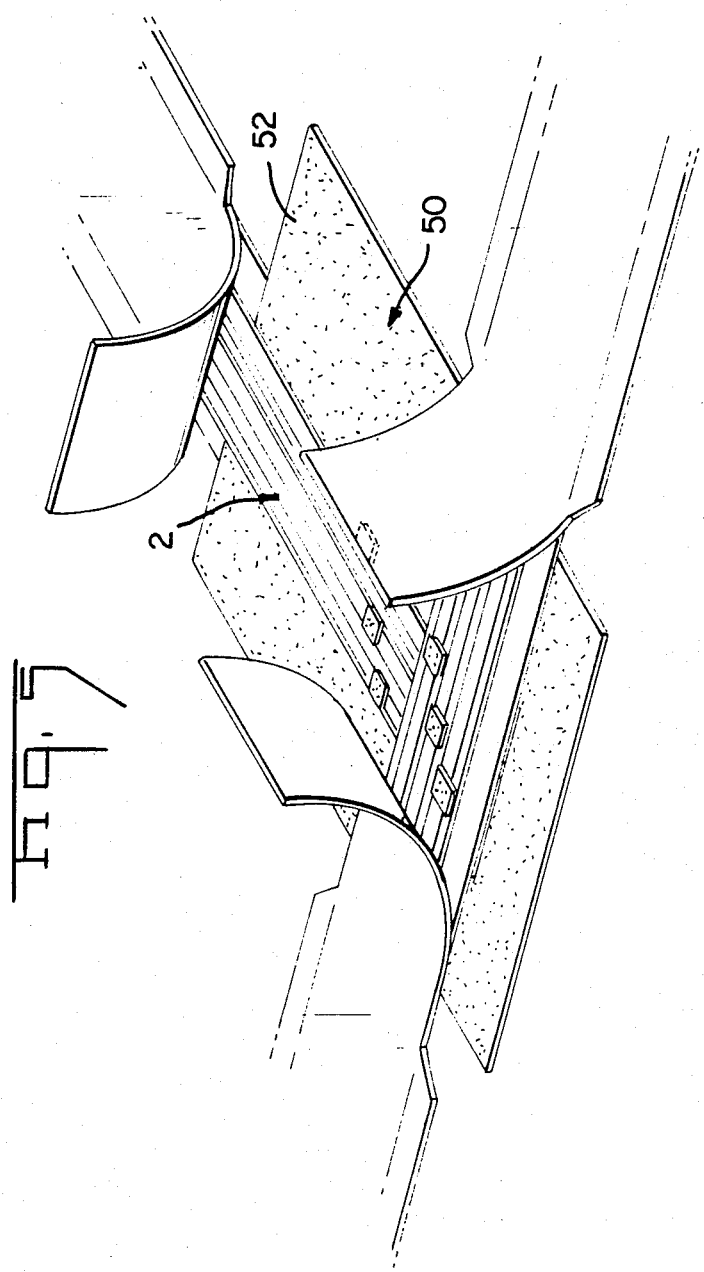

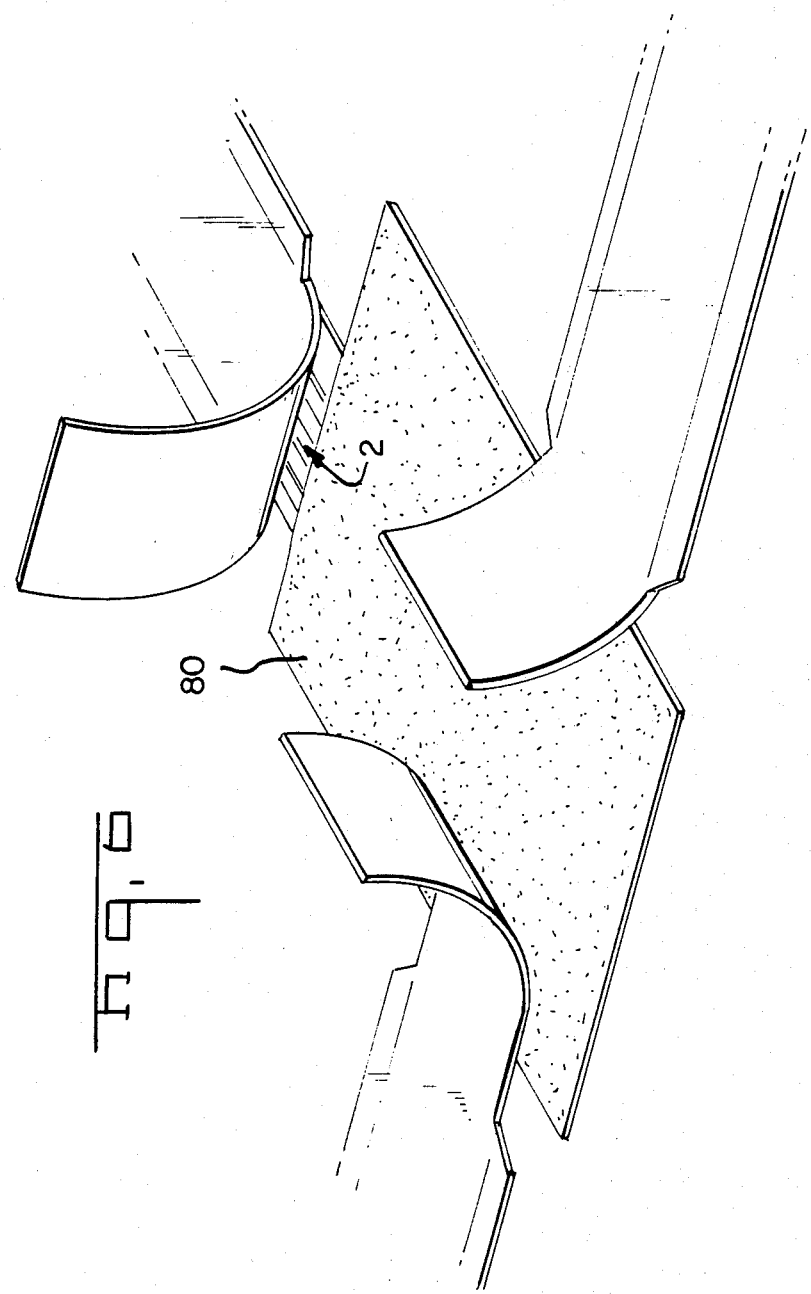

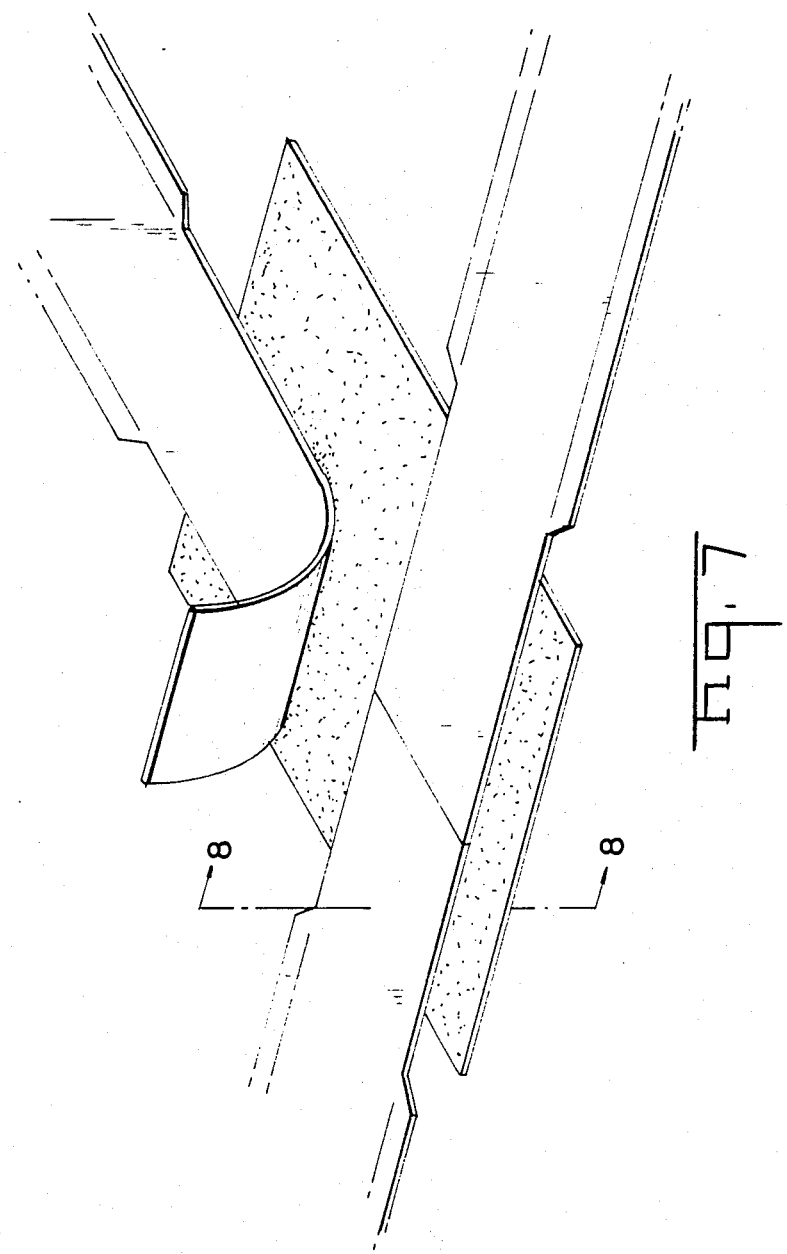

INSULATIVE COVERING FOR UNDERCARPET POWER CABLE SPLICE

BACKGROUND OF THE INVENTION

1. Field of the Invention

The invention relates to an insulating covering for placement over a conductive splice of an electrical flat power cable, particularly electrical flat power cables which are for placement on the floor and beneath the carpet.

2. Description of the Prior Art

It is commonplace in such structures as office buildings and the like to have electrical power cable routed within the building, on the floor of the building and beneath the carpeting; so-called undercarpet power cable. This type of cable power system is advantageous in office buildings where modular offices are likely, and where the relocation of people is commonplace. For example, the electrical power cable is typically run within the walls of the office buildings in a manner typically found in all structures, including homes or residences, with the use of round conductors. However, at the interface of the walls and the floor, a transition to flat undercarpet power cable is made, and the flat cable is actually placed beneath the carpet. In all likelihood, the carpeting is not permanent carpeting as we know it, where the carpeting is tacked to the edges of the walls, but rather is squares of carpeting which are semi-adherent to the floor but yet can be lifted or pulled off of the floor for access to the electrical cabling which rests upon the floor. Such systems are described more fully in U.S. Pat. Nos. 4,319,075 and 4,417,096, incorporated herein by reference.

In such systems, it is typically required to splice the ends of flat undercarpet power cable to an end of a new section of cable. Such splices are commonly made with a metallic splice member having insulation piercing contacts which effect an electrical connection from one cable to the next. Such conductive splices are shown in U.S. Pat. No. 4,560,224, incorporated herein by reference. The cables are routed to local access points within the building which require the power. More specifically, floor mounted duplex receptacles are included within the system and are interconnected to the flat undercarpet power cable. A flat metallic ground plane is then placed over the top of the flat undercarpet cable.

An advantage of such a system is found in the replacement and/or ease of changing electrical requirements within the building due to relocation or changing power requirements. It should be appreciated that the carpet squares can merely be uplifted for accessing the power cable, and further cable sections can be added or rerouted to other areas of the building where the power is needed.

While the thickness of the cable is advantageous for placement beneath the carpet, making such systems easily installable, there are also disadvantages to this system. A disadvantage to having such a system is that, due to the location of the cable, a splice cannot be merely made as in conventional round wire circuits, that is, by merely adding another junction box within the wall and making the splice within the box. Having a plurality of junction boxes within the floor of the building would negatively affect the very advantage of the system. It should also be appreciated that the splicing of electrical cables must also meet standards within the industry, such as U.L. and NEMA, in addition to standards which are set by local authorities.

Three requirements must be met when considering such a covering for conductive splices. First, the conductive splice must be sealed from atmospheres such as moisture. Given that these flat cables are placed upon the floors of buildings, it must be assumed that water would, at some point, be present on the floor. Thus, these coverings must be able to be sealed from atmospheres of water. Second, the coverings must electrically insulate the conductive splice members from the ground shield which is placed over the cable. Third, the coverings must offer some type of physical protection from the activity which takes place above the carpet. For example, heavy desks and cabinets are placed on top of the carpet and on top of the cable and the coverings must withstand such abuses.

The present method of making such a splice is to use a splice covering which includes a gelatinous material enclosed within two insulating sheets. The insulating sheets are adhered at side edges thereof to seal the gelatinous material therein. The gelatinous material is nonconductive and seals the interior of the covering from the entry of water. The gel is so viscous that even if the side edges of the insulating sheets allow water therein, the water could not permeate through the gel to a position where it would react with the conductive splice members on the cable. The insulating sheets themselves perform the other two requirements of the splice covering; that is, they protect the interior splice from the activity above the carpeting, and they insulate the splice member from the ground shield placed above the flat cable. While this insulating mechanism is adequate for all purposes, the insulator is somewhat cumbersome to use, that is, in coordinating this gelatinous material while yet attempting to place the insulating coverings over the splice.

SUMMARY OF THE INVENTION

With the above-mentioned background in mind, an object of the present invention is to design a dry insulator which is much easier to apply than the earlier designs yet offers the same quality of electrical insulation, sealing and protection.

The aforementioned object was accomplished for an undercarpet system where flat multiconductor cable is routed from a power source to local access points for such power usage. The mechanism for insulating electrically spliced portions of the cable comprises at least one foam member for placement over the spliced joint, where the foam includes means for retention against the joint.

In the preferred embodiment of the invention, the foam is of a thickness to allow compression of the foam such that the foam at edges of the joint remains in an uncompressed state thereby sealing the edges of the joint.

It is also preferred to include a second foam member where the first and the second foam members are retained against each other. Preferably, the two facing surfaces of the first and second foam members includes an adhesive thereon which, when the two faces are placed together, adheres the first and second foam members together. It is also preferable to have the foam members of a collective thickness to allow compression thereof to encapsulate the spliced joint within the foam without effecting the adhesion of the foam members at an edge of the spliced joint.

It is further preferred that each foam member includes a double backed adhesive. In this manner, the two facing surfaces of the foam can be adhered together, and an insulative sheet of material can be affixed to the adhesive on the outer surfaces of the foam.

BRIEF DESCRIPTION OF THE DRAWINGS

FIG. 1 is an isometric view depicting two undercarpet power cables poised for a spliced interconnection.

FIG. 2 is an isometric view of the terminal splice for an in-line splice.

FIG. 3 is an isometric view showing the terminal of FIG. 2 in the spliced configuration.

FIG. 4 is a spliced terminal for a right angled electrical interconnection.

FIG. 5 is an isometric view similar to that of FIG. 1 showing two undercarpet power cables in a spliced configuration with the lower portion of the dry insulator placed beneath the electrical splice.

FIG. 6 is similar to that of FIG. 5 showing the upper half of the dry insulator placed over the conductive splice members.

FIG. 7 shows the completed assembly with the shields placed on top of the dry insulator.

FIG. 8 is a cross-sectional view through lines 8—8 of FIG. 7.

DETAILED DESCRIPTION OF THE PREFERRED EMBODIMENT

Figure 9:
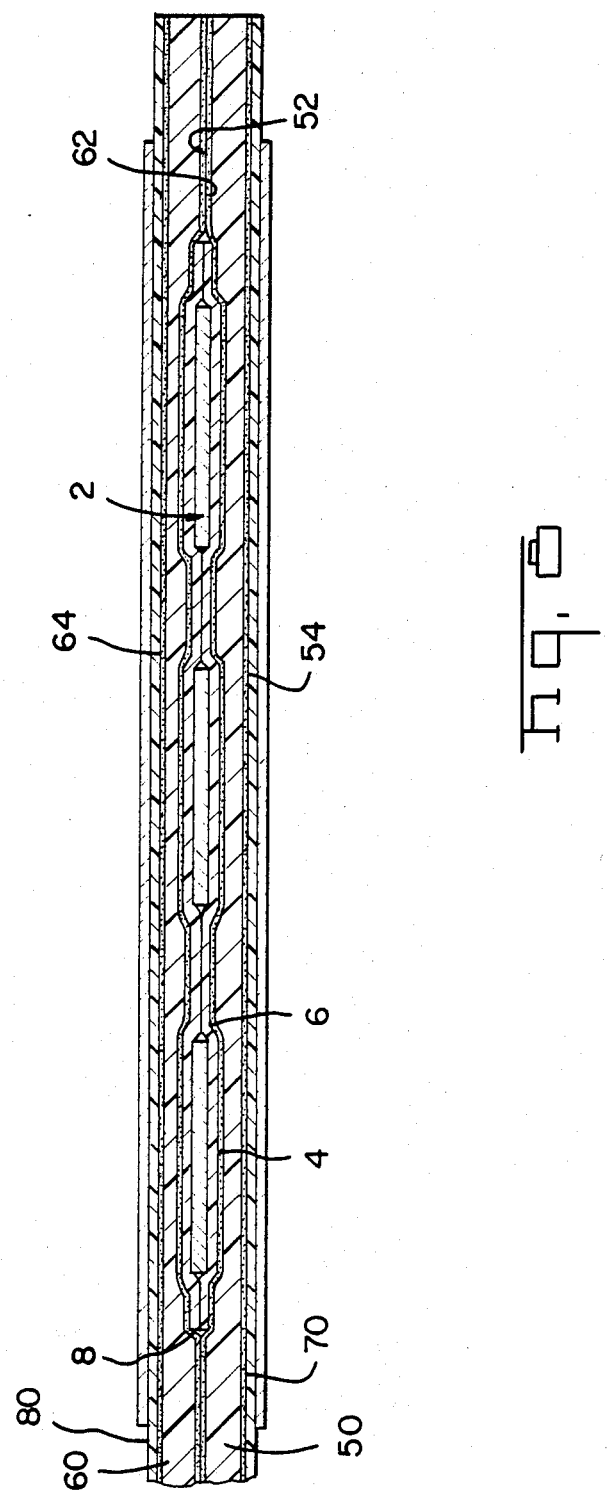

With reference first to FIG. 1, the dry insulator of the instant invention is for use with undercarpet power cable of the type comprising flat conductors such as 4, having insulation 6 surrounding the flat conductors 4. The insulation 6 could either comprise a single composite extrusion surrounding the three power conductors, or the insulation 6 could alternatively comprise two layers of laminated insulation adhesively fixed togeher. The dry insulator will be particularly used in the area where two flat undercarpet cables are interconnected via splice terminals, such as 30 shown in FIG. 2, or as splice terminals 30' as shown in FIG. 4. The electrical terminals shown in FIGS. 2 and 4 and the interconnection thereof is the subject of U.S. Pat. No. 4,560,224 and is incorporated herein by reference. Suffice it to say for this discussion that the terminal 30, as shown in FIG. 2, can be used to splice two ends of undercarpet flat cable while the terminal shown as 30' in FIG. 4 can splice two undercarpet flat cables which are in a "T" configuration, as shown in FIG. 1.

It has been found to be particularly useful for the purpose of sealing the electrical connection to place a first piece of foam having a double backed adhesive, such as 50, beneath the electrical connection such that the release film on the side facing the electrical connection is removed, thereby adhesively affixing the foam to the electrical connection. As shown in FIG. 6, a second piece of foam is then placed on top of the first piece with the release film removed from the side facing the electrical connection such that the adhesive on the foam is adhesively affixed to the electrical connection and to the adhesive side of the first piece of foam 50. It is also anticipated that a piece of VINYL insulation, such as 80, is adhesively affixed to the outside surfaces of the foam via the outside surface which includes a double backed adhesive. As shown in FIG. 7, the assembly can be completed by overlying the shield members 20 on top of the dry insulator and then covering the electrical flat cable with carpeting.

As shown in FIG. 8, the interface between the two foam members is depicted by a cross-section through lines 8—8 of FIG. 7. Such splice insulators require that a void less than 3 mils exists at the side edges of the spliced joint, such as 8, of the cable at the interface between the insulator and the cable. A void of greater than 3 mils will act as a capillary which will attract, via capillary attraction, any water or moisture which may be present on the floor. However, a void smaller than 3 mils is too small for capillary attraction, as the surface tension of the water appears to be too great at such a small opening or capillary.

It has been found quite advantageous to place two foam layers, such as 50 and 60, together over the electrical connection of two undercarpet power cables. The foam which has been found to be most useful is manufactured by Morgan Adhesives Inc. and is commerically available as Type No. IM2750. This particular foam includes a first adhesive surface 52 and a second and outer adhesive surface 54. The upper foam layer 60 is identical to that of 50, having a first adhesive surface 62 and an outer adhesive surface 64. As purchased, the double backed foam 50 and 60 includes thereon on the inner and outer surfaces 52, 54 and 62, 64, respectfully, a release film which is easily peeled off when adhesion is required.

When the two layers of foam 50 and 60 are placed together, sandwiching the electrical terminal and the undercarpet power cable thereinbetween, as shown in FIG. 8, such that the two adhesive surfaces 52 and 62 are adhered together, merely squeezing the two foam members together creates a sealed electrical interconnection without a void at the side edges 8 of the undercarpet power cable. This is due to the compression of a portion of the foam material which surrounds the insulated power cable. Thus, the foam materials 50 and 60 must be thick enough to allow the undercarpet power cable 2 to embed itself within the foam layers 50 and 60 when the two are adhesively fixed together. It has been found that the most desirable thickness for the foam layer is approximately 30 mils in thickness. This thickness allows for enough compression to allow the undercarpet power conductor to embed itself within the foam, but it is not so thick that the overall insulator size is too thick to increase the thickness of the insulator. If the thickness of the foam layers is less than 30 mils, the undercarpet power cable will most likely not have enough compression within the foam layers to embed itself within the foam layers; therefore, a void will occur at the side edges, such as 8, of the undercarpet power cables.

Such splice insulators must qualify under two separate requirements for U.L. recognition, one requirement being a sealing requirement while the other requirement is a puncture requirement such that objects which may be rolled on the floor after the installation do not puncture through the insulator, possibly shorting out the electrical splice terminals. It has been found most desirable to include an outer layer of insulation, such as VINYL or POLYESTER, in the neighborhood of 6 mils, which can be adhesively fixed to the outer surfaces 54 and 64 of the foam layers 50 and 60 via the outer adhesive surfaces. It is anticipated that the foam splice insulators 50 and 60 would be pre-prepared with the outer vinyl coverings 70 and 80 pre-adhered to the outer adhesive surfaces 54 and 64 of the foam layers 50 and 60 such that application of the two foam layers 50 and 60 would only require removal of the inner release films on surfaces 52 and 62.

I claim:

1. In an electrical power distribution system for undercarpet use comprising a flat multiconductor cable routed from a power, source to local access points for power usage, further comprising an insulating splice mechanism insulating electrically spliced joints of the cable, wherein the improvement comprises:

at least one foam member placed over the spliced joint, where the foam member includes means for retention against the spliced joint.

2. The distribution system of claim 1 wherein the foam member is in a compressed state where the foam member overlies the spliced joint, yet in an uncompressed state beyond edges of the joint thereby sealing the edges of the spliced joint.

3. The distribution system of claim 2 wherein the foam member is on the order of 30 mils in thickness.

4. The distribution system of claim 1 further comprising a second foam member, the first and the second foam members being retained against each other.

5. The distribution system of claim 4 wherein the two facing surfaces of the first and second foam members include an adhesive thereon which adheres the first and second foam members together.

6. The distribution system of claim 5 wherein the foam members are of a collective thickness to allow compression of the foam members without effecting the adhesion of the foam members at an edge of the spliced joint.

7. The distribution system of claim 6 wherein the foam members are at least 30 mils in thickness.

8. The distribution system of claim 6 wherein the foam members are between 20 and 40 mils in thickness.

9. The distribution system of claim 4 wherein in each foam member includes a double backed adhesive.

10. The distribution system of claim 9 wherein outer surfaces of the foam members include an insulative sheet of material affixed to the adhesive.

* * * * *